(No Model.) 3 Sheets—Sheet 2.
M. J. PEPPARD.
DEVICE FOR USE IN ERECTING DOCK BENTS, &c.
No. 563,405. Patented July 7, 1896.
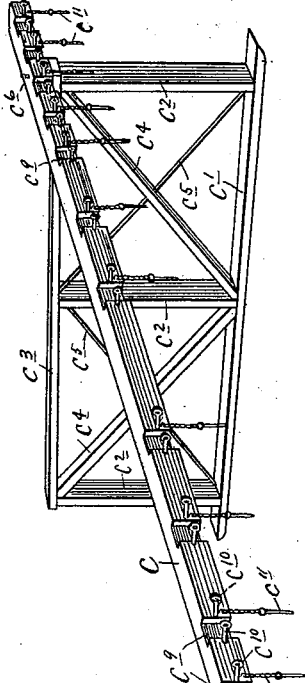
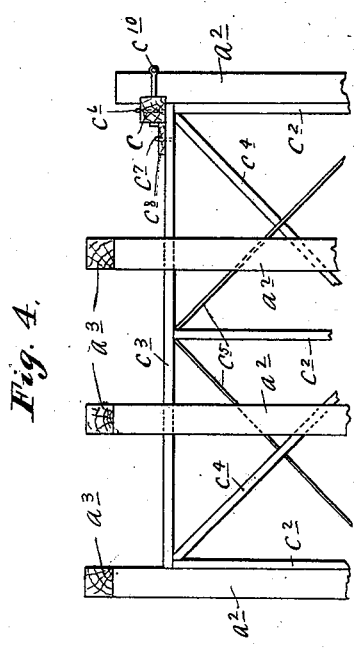
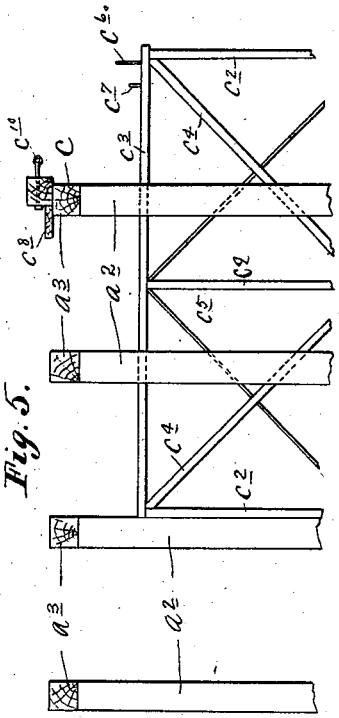
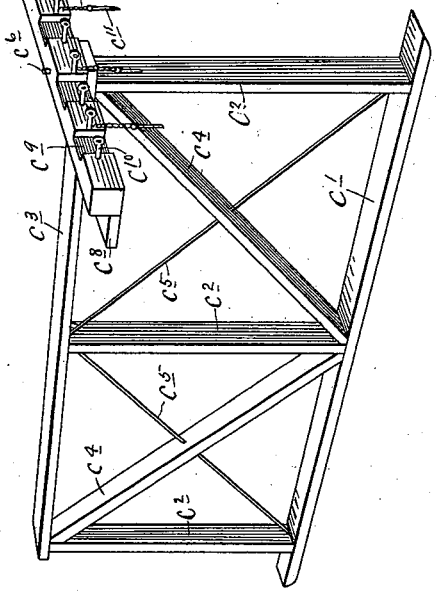
Witnesses.
C. F. Kilgun
R. D. Merchant
Inventor.
Matthew J. Peppard.
By his Attorney,
Jas. F. Williamson.

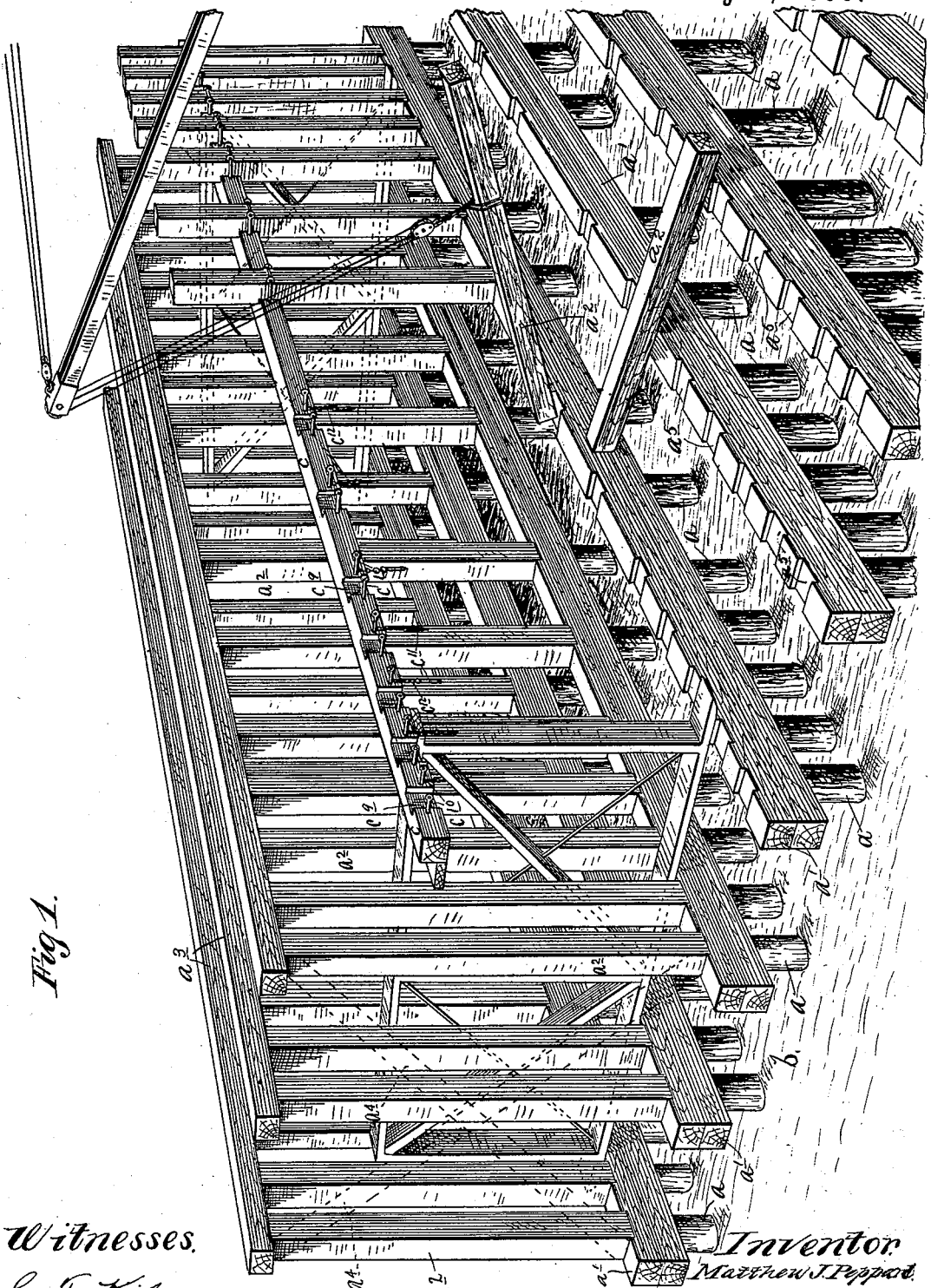

(No Model.) 3 Sheets—Sheet 3.

M. J. PEPPARD.
DEVICE FOR USE IN ERECTING DOCK BENTS, &c.

No. 563,405. Patented July 7, 1896.

Witnesses.
C. F. Kilgore
R. D. Merchant

Inventor
Matthew J. Peppard.
By his Attorney,
Jas. F. Williamson

UNITED STATES PATENT OFFICE.

MATTHEW J. PEPPARD, OF MINNEAPOLIS, MINNESOTA.

DEVICE FOR USE IN ERECTING DOCK-BENTS, &c.

SPECIFICATION forming part of Letters Patent No. 563,405, dated July 7, 1896.

Application filed March 28, 1896. Serial No. 585,264. (No model.)

*To all whom it may concern:*

Be it known that I, MATTHEW J. PEPPARD, a citizen of the United States, residing at Minneapolis, in the county of Hennepin and State of Minnesota, have invented certain new and useful Improvements in Devices for Use in Erecting Dock-Bents, &c.; and I do hereby declare the following to be a full, clear, and exact description of the invention, such as will enable others skilled in the art to which it appertains to make and use the same.

My invention has for its object to provide a convenient and serviceable device for use in erecting the bents of docks or other structures, with a view of dispensing with a large amount of human labor hitherto required for that purpose.

To this end my invention consists of the novel devices and combinations of devices hereinafter described, and defined in the claims.

The invention is illustrated in the accompanying drawings, wherein, like letters referring to like parts throughout the several views—

Figure 6:
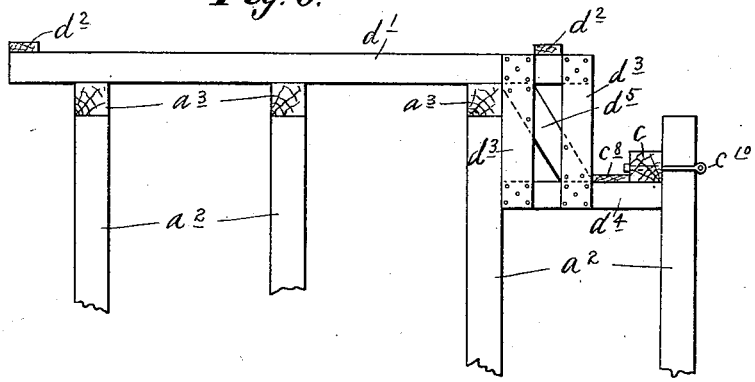
Figure 7:
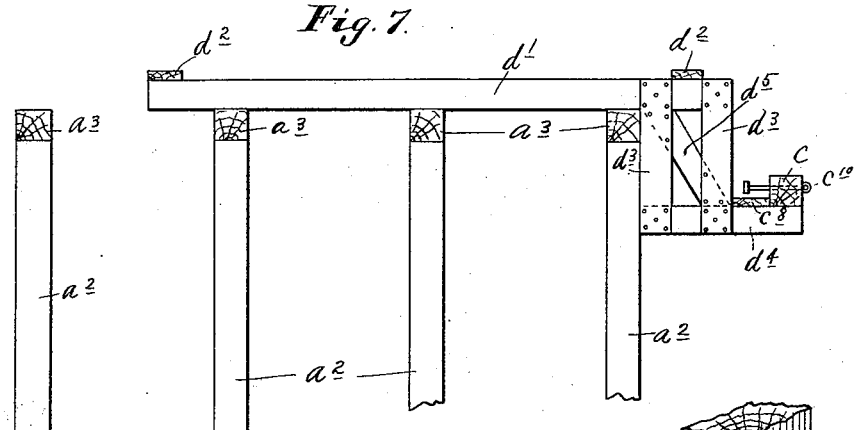
Figure 8:
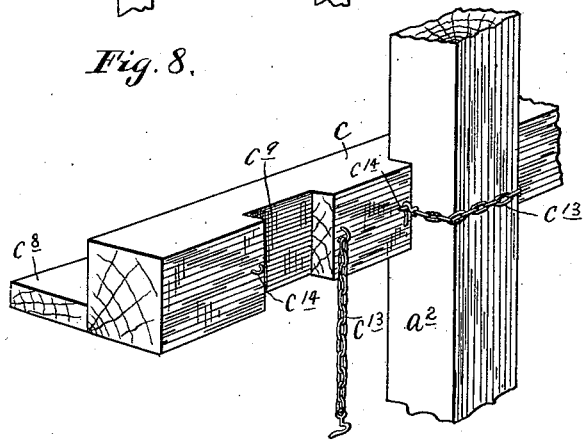

Figure 1 is a perspective view showing a part of a dock as it would appear when in the process of erection, with some parts shown in dotted lines only. Fig. 2 is a perspective view of the preferred form of my invention detached. Fig. 3 is a detail of the same in perspective, with some of the parts broken away; and Figs. 4 and 5 are end elevations with some parts broken away, showing the device as it would appear when applied in use on the dock, the said Fig. 4 showing the same in working position, and the said Fig. 5 showing the parts as they would appear when being moved forward into position for the next bent. Figs. 6 and 7 are end elevations with some parts broken away, showing a modified form of the invention as it would appear when in use on the dock, the said Fig. 6 showing the same as it would appear after a given bent was erected, and Fig. 7 as it would appear after having been moved forward in position for erecting the next bent. Fig. 8 is a detail in perspective, showing a modified form of retaining device which may be used instead of the retaining device shown in the other views for temporarily securing the uprights to the alinement-beam of the erecting device.

Having regard, first, to the constituent elements of the dock, $a$ represents the piling; $a'$, the sills; $a^2$, the uprights; $a^3$, the caps, and $a^4$ the braces which tie the bents together in their erected position. The sills $a'$ are cut away at the proper points to afford seats $a^5$ for the lower ends of the uprights $a^2$ when in their erected position. When the uprights have been erected and lined up in their proper positions, they are spiked to the sills $a'$ at their lower ends and have the caps $a^3$ applied to their upper ends to complete the bent. The last-erected bent is then tied to the previously-erected structure by the application of the braces $a^4$.

In Fig. 1 of the drawings the water-line is shown at $b$. The above statement is a brief description, in outline, of the way in which docks or similar structures are usually built. To persons familiar with this class of work it is well known that the timbers, or necessary parts of whatever material they may be composed, are heavy and must be used in great numbers in order to secure a dock of the requisite strength for the great load and rough usage required therefrom. For example, it will be readily understood what a powerful structure is required for use as a coal or iron dock at the shipping-ports of the Great Lakes.

Hitherto, prior to my invention, it has been the custom, so far as I am aware, to "pack" the bents with the parts all laid down in a horizontal position, and then to raise or erect the "packed" bent by the application of power and the assistance of a large number of men to guide the parts into proper position. Otherwise stated, the uprights were laid down flatwise across the sills, parallel with each other and properly spaced apart, with their feet on the sill which is to finally support the same, and the cap was then made fast to the outer ends of the uprights. Then the whole bent was raised by the application of power and the assistance of a large number of men, as above stated. On account of the great weight of the packed bents a strong engine or engines was required to raise the bent, and owing to the number and necessary working positions of the workmen, working with their pikes, cant-hooks, &c., the men were necessarily more or less in each other's way and could not, even if they would, work in perfect time or unison or guide the parts in an absolutely uniform manner. The uprights were liable to be racked, twisted, or canted more or less in respect to each other and in respect to their common cap, thereby requiring considerable time and labor to realine and plumb the same after the bent was raised. It was, therefore, under the old plan a tedious and expensive piece of work to erect the bents of docks or similar structures.

It is the object of my invention to overcome the above objections to a very large extent, and thereby greatly reduce the cost of erecting such structures.

To this end I provide an erecting device comprising an alinement-beam $c$ and a suitable carrier or carriers for the same, which carriers I prefer to make in the form of single-runner sleds, the parts of which are marked $c'$ to $c^5$ in Figs. 1 to 5, inclusive, but which may be in the form of a flat skeleton frame with an offset or stepped-forward portion, as shown in Figs. 6 and 7, and the parts of which are marked with the letters $d'$ to $d^5$, inclusive.

Having regard, first, to the preferred form of carriers, as shown in Figs. 1 to 5, for the alinement-beam $c$, the parts $c'$ to $c^5$ constitute single-runner sleds with narrow vertical bodies, adapting the same to work between any two longitudinal series of the uprights $a^2$ in the erected part of the dock as guides, and to be moved lengthwise of the docks thus guided with the runners $c'$ resting on the sills $a'$. The cap-plates $c^3$ of the said sleds are provided, at their forward ends, with dowel-pins $c^6$ $c^7$, which engage with corresponding seats or passages in the alinement-beam $c$, and a foot-board $c^8$, fixed to the beam $c$, for removably holding the alinement-beam $c$ and the foot-board $c^8$ in proper position at the forward ends of the cap-plates $c^3$ of the sleds. The alinement-beam $c$ is cut away on its forward face at proper points to form seats $c^9$ for receiving the backs of the uprights $a^2$. The said seats $c^9$ are of course spaced apart distances corresponding to the spacing of the seats $a^5$ in the sills $a'$ for the lower ends or feet of the uprights $a^2$, and when the said alinement-beam $c$ is in its proper position on the sleds the said seats $c^9$ on the front face thereof will be or should be directly over and in line with the rear portions of the said seats $a^5$ on the sills $a'$.

Suitable retaining devices are provided for coöperation with the seats $c^9$ to hold the uprights $a^2$ in their proper relative positions against the alinement-beam $c$. As shown in all the views except Fig. 8, these retaining devices are in the form of a pair of nutted eyebolts $c^{10}$, one on each side of any given seat $c^9$, and a pin $c^{11}$, made fast by chain $c^{12}$ to the beam $c$ and adapted to engage with the eyes of the bolts $c^{10}$ after the upright $a^2$ is in the seat $c^9$. Instead of the parts $c^{10}$, $c^{11}$, and $c^{12}$, as just noted, I may employ a simple chain $c^{13}$, made fast at one end to the beam $c$ on one side the seat $c^9$, and provided with a hook at its free end engageable with a staple or other equivalent device $c^{14}$ on the opposite side of the seat $c^9$ after having been passed around the erected upright $a^2$, as shown in Fig. 8.

The action or usage of my invention in its preferred form will readily be understood from an inspection of Figs. 1, 4, and 5. In said Fig. 1 the temporary support or erecting device is shown as in position for erecting the fourth bent of a dock. Several uprights of the fourth bent are shown as having been raised into their upright position and bound to the alining-beam $c$. Another upright $a^2$ is represented as in the act of being raised into its upright position by an ordinary hoisting-crane, the boom of which is shown at $f$. An operator stands on the foot-board $c^8$ and as quickly as the upright is brought into its upright position guides the same into its proper seat $c^9$ against the alinement-beam $c$ and secures the same by applying the pin $c^{11}$ to the eyebolts $c^{10}$. In this way one after the other of the uprights are erected and held properly alined in their upright position against the alinement-beam $c$. When the entire series of uprights $a^2$ for that particular bent have thus been erected, a cap $a^3$ is applied thereto, the bent is plumbed up, if necessary, the braces are applied to tie the same back to the previously-erected structure, and the lower ends of the uprights are spiked fast to the sill. The block and tackle of the crane is then attached to the alinement-beam $c$ and the foot-board $c^8$, and the power is applied to lift the same vertically off from the dowel-pins $c^6$ and $c^7$ of the sleds from the position shown in Figs. 1 and 4 to the position shown in Fig. 5, or, in other words, from its last previous working position to or over the top of the last or newly erected bent. Then the sleds are moved forward one step, or into the position shown for one of the said sleds in Fig. 5. The sleds may thus be moved forward in any suitable way, as, for example, by the windlass of the hoisting-engine, (not shown,) which would naturally be in use on the advanced part of the dock. Then the beam $c$ and the foot-board $c^8$ are moved forward by the crane and dropped down onto the sleds, being properly guided to their required position by the workmen and the dowel-pins $c^6$ $c^7$. Everything is then in readiness to go forward with the erection of the next bent of the dock. The proper amount of forward movement to be given to the sleds is readily indicated either by the uprights $c^2$ of the sled-bodies relative to the rear face of the sills or by a mark on the sled-runners.

In the modified form of the erecting device shown in Figs. 6 and 7 the flat skeleton frame formed by the parts $d'$ and $d^2$ is adapted to rest on the caps of the bents previously erected, and the forward step portion of the same, composed of the parts $d^3$ $d^4$ $d^5$, is adapted to overhang the cap of the last previously-erected bent. The alinement-beam $c$ and the foot-board $c^8$ are permanently secured to the horizontal arms $d^4$ of the said overhanging part of the carrier, as clearly shown in Figs. 6 and 7. The parts $d^3$ $d^4$ $d^5$, together with the alinement-beam $c$ and foot-board $c^8$, therefore constitute a gage or spacing device, which serves to properly locate the alinement-beam $c$ at the right distance forward of the last-erected bent for receiving the uprights $a^2$ of the new bent. The uprights are then raised by the power device and temporarily fastened to the alinement-beam $c$ of said carrier in the same way as in the other form. After the bent has been completed and tied back to the previously-erected structure, the crane is applied to lift the forward end of the carrier $d'$ $d^5$ over the top of the bent just erected and to move the same forward one step from the position shown, for example, in Fig. 6 to the position shown in Fig. 7, and when this is done all the parts will be in position for use in erecting the next bent.

I have used both forms of the erecting device with success; but I prefer the form shown in Figs. 1 to 5 because of its adaptation for true guidance by the dock structure itself in the advancing movement of the carriers over the dock. It is also more stable than the form shown in Figs. 6 and 7, and requires less power and no more time to move than the other form.

By actual experience I have demonstrated that with the use of this erecting device or invention herein disclosed ten men will do much more work than could before be done on the old plan with twenty men, and the work, moreover, will be done better.

It will be understood, of course, that many of the minor details of the construction might be changed without departing from the spirit of my invention. The carriers for the alinement-beam may take any suitable form, so long as they are movable forward over the dock. The foot-board $c^8$ is a convenience, but not a necessity. It will also be understood that the invention herein disclosed would be capable of use in the erection of bents employed in structures for many other purposes, as, for example, in trestleworks, buildings, &c., and would, of course, be used in the same way, regardless of whether the structure was to be a framework of wood or framework of metal.

I believe that I am the first to provide any kind of temporary support to which the uprights of a bent may be temporarily secured, in succession, as erected, and be thereby alined and held until capped or tied together in their erected position, and which support may then be moved forward to serve the same function in the erection of the next bent, and so on, for the whole dock, and I desire to claim the same herein, in the broadest possible way, as a pioneer invention.

It will be understood, of course, that my said invention would be used for the second or any other higher bench of the dock in the same way as it is used for the lower bench, as shown in the drawings. In the case of the preferred form the carriers or sleds would then travel on the caps of the first bench when in use for erecting the bents of the second bench, and if the form of device shown in Figs. 6 and 7 should be employed the same would be mounted to move over the caps of the second bench in the same way as shown in said views for the first bench.

What I claim, and desire to secure by Letters Patent of the United States, is as follows:

1. A device for use in erecting the bents of docks or other structures, comprising the combination with one or more carriers, of an alinement-beam supported by said carrier or carriers to which the uprights may be temporarily secured until capped or tied in their erected position, and which carriers and alinement-bar are movable forward, over the dock, to serve the same function in the erection of successive bents, substantially as described.

2. A device for use in erecting the bents of docks or other structures, comprising two or more carriers adapted to be moved over the horizontal timbers or parts of the structure and be guided by the uprights of the same, and an alinement-beam removably secured to said carriers and provided with retaining devices for temporarily securing the uprights of the bent, being erected, thereto, until capped or tied in their erected position, substantially as described.

3. In a device for use in erecting the bents of docks or other structures, the combination with sled-like carriers adapted to be moved over the horizontal timbers and guided by the vertical timbers, or parts of the erected structure, of an alinement-beam removably secured to said sled-like carriers, and retaining devices for temporarily securing the uprights to said beam, until capped or tied together in their erected position, substantially as described.

4. In a device for use in erecting the bents of docks or other structures, the combination with one or more carriers, of an alinement-beam supported by said carrier or carriers, to which the uprights may be temporarily secured until capped or tied in their erected position, and a foot-board also supported by said carriers directly adjacent or together with said alinement-beam, which parts are movable forward, over the dock, to serve the same function in the erection of successive bents, substantially as described.

In testimony whereof I affix my signature in presence of two witnesses.

MATTHEW J. PEPPARD.

Witnesses:
E. F. ELMORE,
JAS. F. WILLIAMSON.